US010930098B2

(12) United States Patent
Lu

(10) Patent No.: US 10,930,098 B2
(45) Date of Patent: Feb. 23, 2021

(54) OBJECT DISPLAY FRAME, DATA PROCESSING METHOD, DEVICE, EQUIPMENT AND SYSTEM

(71) Applicant: ADVANCED NEW TECHNOLOGIES CO., LTD., Grand Cayman (KY)

(72) Inventor: Chuan Lu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/905,432

(22) Filed: Jun. 18, 2020

(65) Prior Publication Data

US 2020/0320810 A1 Oct. 8, 2020

Related U.S. Application Data

(63) Continuation of application No. PCT/CN2018/125188, filed on Dec. 29, 2018.

(30) Foreign Application Priority Data

Jan. 25, 2018 (CN) ........................ 201810074294.0

(51) Int. Cl.
*G07C 9/00* (2020.01)
*G06Q 20/32* (2012.01)
*G08B 13/14* (2006.01)

(52) U.S. Cl.
CPC ..... *G07C 9/00571* (2013.01); *G06Q 20/3276* (2013.01); *G08B 13/1463* (2013.01); *G08B 13/1472* (2013.01)

(58) Field of Classification Search
CPC ............ G07C 9/00571; G06Q 20/3276; G08B 13/1463; G08B 13/1472
See application file for complete search history.

(56) References Cited

U.S. PATENT DOCUMENTS 5,914,658 A * 6/1999 Arakawa .............. A47G 1/1686 340/568.8
6,791,450 B2 * 9/2004 Gokcebay .............. G06Q 40/04 340/5.73

(Continued)

FOREIGN PATENT DOCUMENTS

CN 201076255 Y 6/2008
CN 201408451 Y 2/2010

(Continued)

OTHER PUBLICATIONS

First Office Action and First Search of CN Application No. 2018100742940, dated Feb. 15, 2020, (21 pages).

(Continued)

*Primary Examiner* — Munear T Akki

(57) ABSTRACT

Provided are a display frame for displaying objects, and an object processing method, device, apparatus, and system. The display frame includes: a lock assembly configured to lock an object on the display frame, the locked object being touchable by a user; a graphic code scanner configured to scan a graphic code to perform resource transfer for the locked object; a circuit configured to send the scanned graphic code to a server for performing identity verification on the user, and when the identity verification succeeds, initiate the resource transfer for the locked object, wherein the circuit is configured to send to the lock assembly an unlocking signal for controlling opening of the lock assembly when the resource transfer has been successfully performed, and in response to the unlocking signal, the lock assembly is configured to be opened to disengage the object locked from the display frame.

15 Claims, 7 Drawing Sheets

103

102

(56) References Cited

U.S. PATENT DOCUMENTS 8,884,762 B2 * 11/2014 Fawcett ............ G08B 13/1463 340/568.2
10,161,178 B1 12/2018 Appleby
2003/0161503 A1 8/2003 Kramer
2007/0159328 A1 * 7/2007 Belden ................ G08B 25/008 340/571
2009/0096607 A1 * 4/2009 Brosnan ................ G06Q 20/20 340/568.1
2011/0291798 A1 12/2011 Schibuk
2012/0169460 A1 7/2012 Thumparthy
2014/0316916 A1 10/2014 Hay
2015/0077232 A1 * 3/2015 Grant .................... G08C 19/12 340/13.24
2015/0186840 A1 7/2015 Torres et al.
2016/0110975 A1 4/2016 Oppenheimer
2016/0133074 A1 5/2016 Amdahl
2016/0224776 A1 8/2016 Leow
2016/0300411 A1 10/2016 Isaacson
2017/0287247 A1 10/2017 Saeedi et al.
2018/0060800 A1 3/2018 Robinson
2018/0091503 A1 3/2018 Tang
2019/0066114 A1 2/2019 Ross
2019/0069436 A1 2/2019 Norton et al.

FOREIGN PATENT DOCUMENTS

CN 202739428 U 2/2013
CN 204105517 U 1/2015
CN 204838827 U 12/2015
CN 205321928 U 6/2016
CN 106157448 A 11/2016
CN 206097296 U 4/2017
CN 107316389 A 11/2017
CN 107393148 A 11/2017
CN 207529473 U 6/2018
CN 108416875 A 8/2018
WO 2017096433 A1 6/2017

OTHER PUBLICATIONS

Second Office Action and Supplementary Search of CN Application No. 2018100742940, dated Apr. 10, 2020, (26 pages).
Third Office Action of CN Application No. 2018100742940, dated Jul. 14, 2020, (25 pages).
International Search Report of Application No. PCT/CN2018/125188, dated Aug. 11, 2020, (2 pages).
Written Opinion of the International Searching Authority of Application No. PCT/CN2018/125188, dated Jul. 25, 2020, (10 pages).
International Preliminary Report of Patentability of Application No. PCT/CN2018/125188, dated Jul. 28, 2020, (12 pages).
Search report of Taiwan Application No. 107145001, dated Jul. 8, 2019, (1 pages).

* cited by examiner

OBJECT DISPLAY FRAME, DATA PROCESSING METHOD, DEVICE, EQUIPMENT AND SYSTEM

CROSS REFERENCE TO RELATED APPLICATION

The present application is a continuation application of International Patent Application No. PCT/CN2018/125188, filed on Dec. 29, 2018, and entitled "OBJECT DISPLAY FRAME, DATA PROCESSING METHOD, DEVICE, EQUIPMENT AND SYSTEM," which claims priority to and based on the Chinese Patent Application No. 201810074294.0, filed on Jan. 25, 2018. All of the above-referenced applications are incorporated herein by reference in their entirety.

TECHNICAL FIELD

The present application relates to the field of computer technologies, and in particular, to a display frame for displaying objects, and an object processing method, device, apparatus, and system.

BACKGROUND

A common commodity display frame includes two parts. There is a semi-cavity inside the display frame. A plurality of mechanisms may be disposed in the cavity for placing commodities. A merchant may place commodities to be displayed or sold on the mechanisms in the cavity. The display frame is sealed with an isolating portion made of transparent material, such as glass or plastics. Through the sealed transparent isolating portion, a user can view commodities displayed inside the display frame.

However, due to obstruction of the sealed transparent isolating portion, a user can only view the commodities displayed inside the display frame through the transparent isolating portion. However, not all information of the commodities needed by the user is displayed. The user cannot check relevant information freely due to the obstruction of the isolating portion, easily causing the user to give up buying the commodities. Therefore, a more simple or reliable solution is needed.

SUMMARY

Embodiments of the application are intended to provide an object display frame, and an object processing method, device, apparatus, and system, so that an object displayed in the display frame is touchable by a user, helping the user learn information of the object in time.

In order to resolve the technical problems, the embodiments of the application are implemented as follows.

Embodiments of the application provide a display frame for displaying objects. The display frame includes: a lock assembly configured to lock an object on the display frame, wherein the locked object is touchable by a user; a graphic code scanner configured to scan a graphic code provided by the user, to perform resource transfer for the locked object; a circuit connected to the lock assembly, wherein the circuit is configured to send the scanned graphic code to a server for performing identity verification on the user, and in response to receiving a result indicating that the identity verification succeeds, initiate the resource transfer for the locked object, and the circuit is further configured to send to the lock assembly an unlocking signal for controlling opening of the lock assembly in response to receiving a notice indicating that the resource transfer has been successfully performed for the locked object, and wherein in response to the unlocking signal, the lock assembly is configured to be opened to disengage the object locked on the lock assembly from the display frame; a pressure sensor disposed on the lock assembly, wherein the pressure sensor is configured to detect a pressure applied by the weight of the locked object on the lock assembly; and an alarm connected to the pressure sensor, wherein the pressure sensor is configured to send a signal to the alarm in response to detecting that the pressure reaches a pressure threshold, and the alarm is configured to receive the signal and output an alarm signal.

In some embodiments, the display frame comprises multiple of the lock assemblies. In some embodiments, the circuit is connected to the multiple lock assemblies, and the unlocking signal includes an identifier of one of objects locked on the multiple lock assemblies.

In some embodiments, the lock assembly comprises a hook for hanging an object and a controllable baffle disposed at an outermost end of the hook for locking the object, wherein in response to the unlocking signal, the lock assembly is configured to be opened to remove the controllable baffle to disengage the object locked on the lock assembly from the display frame.

In some embodiments, the pressure sensor is a gravity sensor disposed on the hook hanging the object, wherein the gravity sensor is configured to detect a gravity value at the hook, and send a signal to the alarm in response to the gravity value at the hook being greater than a gravity threshold.

In some embodiments, the hook and a vertical direction forms an angle, the angle being less than 90 degrees.

In some embodiments, the graphic code comprises resource account information of the user, and the circuit is further configured to send resource information for unlocking the locked object to the server.

Embodiments of the application provide an object processing method. The method is applied to a display frame for displaying objects, and the display frame comprises a lock assembly configured to lock an object on the display frame, the locked object being touchable by a user. The method includes: scanning a graphic code provided by the user to perform resource transfer for the locked object; sending the scanned graphic code to a server for performing identity verification on the user; in response to receiving a result indicating that the identity verification succeeds, initiating the resource transfer for the locked object; and in response to receiving a notice indicating that the resource transfer has been successfully performed for the locked object, controlling opening of the lock assembly to disengage the locked object.

In some embodiments, the display frame comprises multiple of the lock assemblies, and the method further comprises: controlling opening of one of the multiple lock assemblies to disengage a locked object selected by the user based on an identifier of the locked object selected by the user.

In some embodiments, the graphic code includes resource account information of the user.

In some embodiments, wherein the method further comprises: sending, to the server, an unlocking request for the locked object, wherein the unlocking request comprises resource information for unlocking the target object and resource account information of the user.

In some embodiments, before sending, to the server, an unlocking request for the locked object, the method further comprises: obtaining information of the locked object and resource information for unlocking the locked object; and generating the unlocking request for the locked object according to the information of the locked object, the resource information for unlocking the locked object, and the resource account information of the user.

In some embodiments, the lock assembly comprises a hook for hanging an object and a controllable baffle disposed at an outermost end of the hook for locking the object, and wherein controlling opening of the lock assembly to disengage the locked object comprises: removing the controllable baffle to disengage the object locked on the lock assembly from the display frame.

In some embodiments, the method further comprise: detecting a pressure applied by the weight of the locked object on the lock assembly; and in response to detecting that the pressure reaches a pressure threshold, outputting an alarm signal.

Embodiments of the application provide an apparatus for object processing, comprising: one or more processors and one or more non-transitory computer-readable memories coupled to the one or more processors and configured with instructions executable by the one or more processors to cause the apparatus to perform operations comprising: scanning a graphic code provided by a user to perform resource transfer for an object locked on a display frame through a lock assembly; sending the scanned graphic code to a server for performing identity verification on the user; in response to receiving a result indicating that the identity verification succeeds, initiating the resource transfer for the locked object; and in response to receiving a notice indicating that the resource transfer has been successfully performed for the locked object, controlling opening of the lock assembly to disengage the locked object.

Embodiments of the application provide an object processing device, including: a receiving module configured to receive an unlocking request for a target object, where the unlocking request includes resource information required for unlocking the target object and resource account information of a user; a resource transfer module configured to perform resource transfer with respect to the target object according to the resource information required for unlocking the target object and the resource account information of the user in the unlocking request; and a sending module configured to send an unlocking signal to a locking mechanism of the target object.

In the embodiments of the application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request from the server is received to control opening of the locking mechanism of the target object in the display frame to control unlocking of the object, improving object processing efficiency.

BRIEF DESCRIPTION OF THE DRAWINGS

To describe the embodiments of the application more clearly, the following briefly introduces accompanying drawings for describing the embodiments. The accompanying drawings in the following description show merely some embodiments of the application, and a person of ordinary skill in the art may still derive other drawings from these accompanying drawings without creative efforts.

LEGEND

101—Object, 102—Locking mechanism, 103—Communication module, 104—Pressure sensor, 105—Reminder module, 106—Graphic code scanner, 1021—Hook, 1022—Controllable baffle.

DETAILED DESCRIPTION OF THE INVENTION

The application provides an object display frame (also referred to as a display frame for displaying objects), and an object processing method, device, apparatus, and system.

To enable a person skilled in the art to better understand the embodiments in the application, the embodiments of the application will be described clearly below with reference to the accompanying drawings of the embodiments of the application. The described embodiments are merely some rather than all of the embodiments of the application. All other embodiments obtained by a person of ordinary skill in the art based on the embodiments of the application without creative efforts shall fall within the protection scope of the application.

Figure 1:
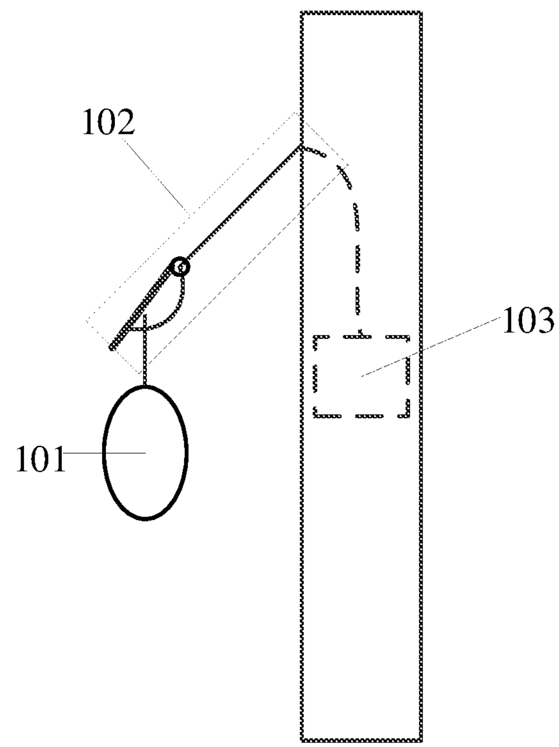
FIG. 1 is a schematic structural diagram of a side view of an object display frame according to some embodiments of the application.

As shown in FIG. 1, embodiments of the application provide an object display frame. The object display frame may include one or more locking mechanisms 102 and a communication module 103.

An object 101 may be anything to be displayed, e.g., any commodity (such as various drinks, foods, books, etc.) or any handicraft (such as jade sculpture, lacquerware, etc.). No limitation is imposed on this in the embodiments of the application. The display frame may be a carrier for displaying any object to be displayed. The display frame may include a floor display frame, a magnetically levitated display frame, a desktop display frame, a hanging display frame, a specially shaped display frame, a theme display stack head, and a rotating display. The display frame in the embodiments of the application may be one of the various above-described display frames. For example, the object display frame may be a hanging display frame or a floor display frame. Characteristics of an object displayed in the display frame can be fully displayed through the display frame. The display frame in the embodiments of the application does not include an assembly (for example, a glass cover or a transparent plastic cover, etc.) that isolates a displayed object from a viewer in an area for displaying the object. In other words, during displaying of the object 101 in the object display frame, the viewer can touch any object 101 displayed therein. The viewer may touch the object 101 and view relevant information recorded on an outer packaging of the object 101, for example, a production date, a shelf life, a production location, etc. of the object 101. In summary, the object 101 displayed in the object display frame in the embodiments of the application may be touched when locked in the display frame.

Figure 2A:
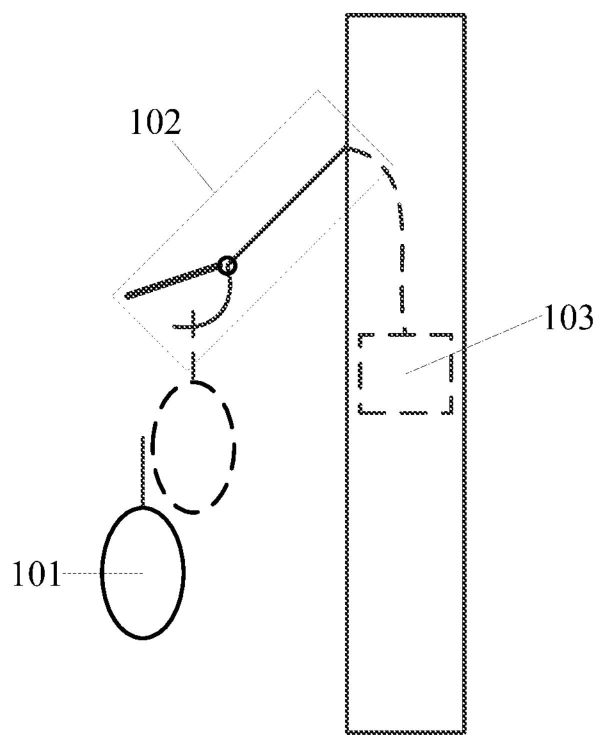
FIG. 2A is a schematic diagram of an object display frame with a locking mechanism opened according to some embodiments of the application.
Figure 2B:
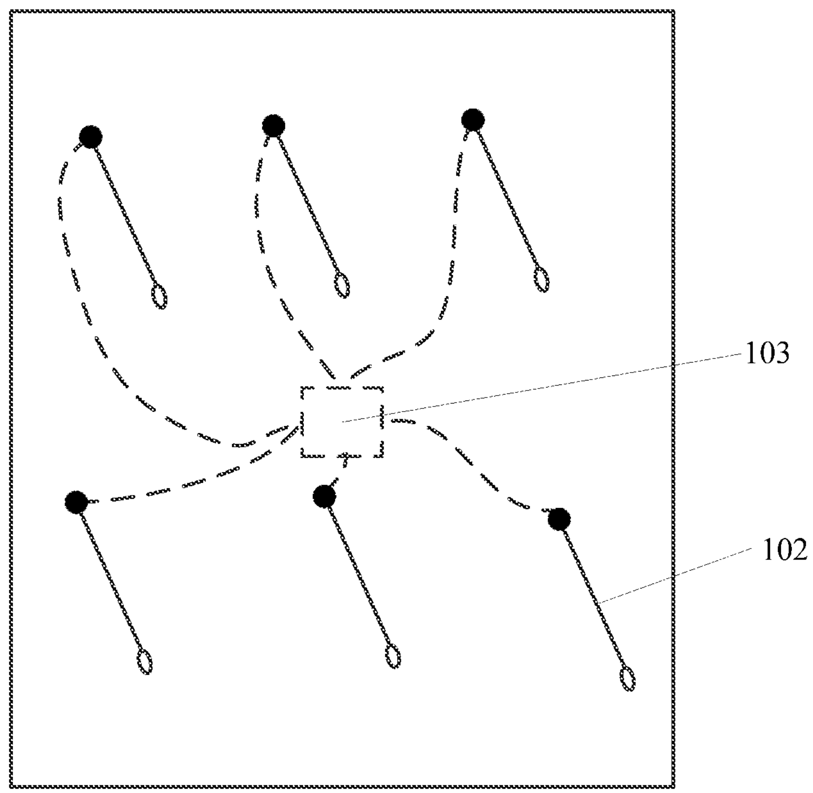
FIG. 2B is a schematic structural diagram of a front view of an object display frame according to some embodiments of the application.

As shown in FIG. 1 or FIG. 2 (FIG. 2A and FIG. 2B), in order to ensure security of the object 101 displayed in the display frame and prevent the displayed object 101 from being lost, stolen, or disengaged from the display frame, one or more locking mechanisms 102 may be disposed in the display frame. The locking mechanism 102 may be presented in the display frame in various manners. For example, one or more fixing rods with a smooth surface and inclined downward are disposed in the display frame, and one or more block parts for preventing the object 101 from sliding off the fixing rod may be disposed on the fixing rods. When a plurality of block parts are disposed on the fixing rod, the plurality of block parts may be distributed on the fixing rod evenly or unevenly. Regardless of whether the plurality of block parts are distributed on the fixing rod evenly or unevenly, a distance between two adjacent block parts on the fixing rod may meet a condition. For example, the distance between the two adjacent block parts is arranged such that the arranged objects 101 do not hinder each other from being viewed by viewers.

Through the locking mechanism 102, the displayed object 101 may be locked in the display frame. In some embodiments, in order to facilitate management of object 101, one object 101 may be arranged on each locking mechanism 102, that is, each locking mechanism 102 locks one object 101. However, the embodiments of the application is not limited to the situation that one locking mechanism 102 locks one object 101. Alternatively, one locking mechanism 102 may lock a plurality of objects 101. For example, in order to improve the sales volume of a commodity, a developer of the commodity sets a corresponding promotional activity, for example, buying one or more commodities and getting a corresponding commodity free (for example, buying one and getting one free or buying two and getting one free, etc.). In such situations, one locking mechanism 102 may lock two, three, or more objects 101. Controlling the locking mechanism 102 can control a corresponding object 101 locked by the locking mechanism 102. In other words, when the locking mechanism 102 is closed, the object 101 arranged on the locking mechanism 102 is locked in the display frame, and when the locking mechanism 102 is opened, the object 101 arranged on the locking mechanism 102 is disengaged from the display frame.

Based on the example in which the locking mechanism 102 is composed of the fixing rod and the block part, the block part may stretch out and draw back between the outside and inside of the fixing rod, and may include a control assembly for controlling the block part to stretch out and draw back. When the control assembly pulls the block part toward the inside of the fixing rod, the corresponding locking mechanism 102 is opened. In such a situation, the object 101 blocked by the block part moves downward along an inclining direction of the fixing rod under action of gravity of the object 101, and is finally disengaged from the fixing rod, that is, the object 101 arranged on the locking mechanism 102 is disengaged from the display frame. Then, a viewer or a user may pick up the object 101. When an object 101 is to be assigned to a locking mechanism 102, and the control assembly can pull the block part toward the inside of the fixing rod, the corresponding locking mechanism 102 is opened. Then, the object 101 may be arranged at the position on the fixing rod at which the block part is located. Then the control assembly may pull the block part from the inside of the fixing rod to the outside of the fixing rod, and the corresponding locking mechanism 102 is closed, so that the object 101 is locked in the fixing rod by the block part, that is, the object 101 arranged on the locking mechanism 102 was locked in the display frame.

As shown in FIG. 1 or FIG. 2 (FIG. 2*a* and FIG. 2B), the communication module 103 may be either a wired communication module 103 or a wireless communication module 103. The communication module 103 may be connected to the one or more locking mechanisms 102 in the display frame respectively. The communication module 103 may be configured to receive an instruction signal (e.g., an unlocking signal) for controlling a corresponding locking mechanism 102 to be opened or closed. In other words, the communication module 103 may receive an unlocking signal sent by an external apparatus. The unlocking signal may include relevant information of an object 101 (for example, a name, a code, or other identifiers of the object 101) that is to be unlocked. The communication module 103 may forward a received unlocking signal to the locking mechanism 102 of the object 101 corresponding to the relevant information. The locking mechanism 102 may open the block part on the fixing rod, so that the object 101 arranged on the locking mechanism 102 is disengaged from the display frame. Thus, a viewer or a user may pick up the object 101.

According to the object display frame provided in the embodiments of the application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user may freely touch the object, check relevant information of the displayed object, and is facilitated to learn the information of the object in time. In addition, unlocking of the object is controlled through process control, improving object processing efficiency.

Figure 3:
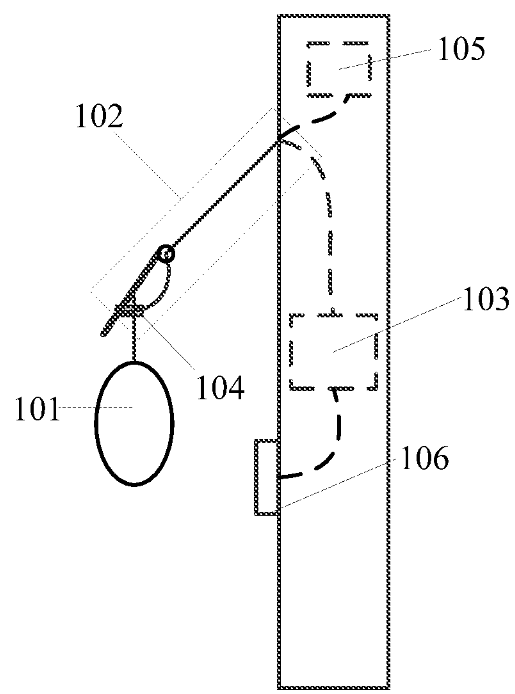
FIG. 3 is a schematic structural diagram of another object display frame according to some embodiments of the application.

FIG. 3 shows another display frame for the object 101, according to some embodiments of the application. The display frame for the object 101 includes all the functional units of the display frame for the object 101 shown in FIG. 1 to FIG. 2 (FIG. 2A and FIG. 2B), and improvement is made on these units. The improvement is as follows.

In order to learn a viewing status of the object 101 by a viewer in time and prevent the object 101 from being stolen, a pressure sensor 104 may be disposed on the display frame. Since the displayed object 101 is locked in the locking mechanism 102, during the detection of the displayed object 101, pressure of each locking mechanism 102 may be detected. To this end, a pressure sensor 104 may be disposed on each locking mechanism 102, and a pressure threshold may be set for a respective pressure sensor 104 on each locking mechanism 102. A relationship between the pressure of the locking mechanism 102 and the pressure threshold is detected in real time, so that the viewing status of the displayed object 101 by the viewer may be determined and it may be determined whether the object 101 is stolen. In order to promptly remind the viewer or the manager correspondingly, a reminder module 105 may be disposed on the display frame. The reminder module 105 may be composed of a speaker, an alarm, or an indicator light. For example, the reminder module 105 may be a speaker, and the speaker may deliver a reminder signal through voice broadcast or a warning tone. In another example, the reminder module 105 may be an alarm, and a reminder signal may be delivered by turning on the alarm. In another example, the reminder module 105 may be an indicator light, and a reminder signal may be delivered through blinking or lighting of the indicator light, etc. The reminder signal may include relevant information of the display frame (for example, a name and other identifiers of the display frame, a name and other identifiers of the locking mechanism 102, etc.) in which the corresponding locking mechanism 102 is located. The reminder module 105 may be connected to the pressure sensor 104. The pressure sensor 104 may monitor the pressure of the locking mechanism 102 in real time. When the detected pressure reaches a predetermined pressure threshold, the pressure sensor 104 may send a reminder signal to the reminder module 105. After the reminder signal is received, the reminder module 105 may extract the relevant information of the display frame from the reminder signal, and determine the corresponding locking mechanism 102 using the relevant information of the display frame. The reminder module 105 may display the reminder signal or output the reminder signal through voice broadcast.

In addition, in order to well fix the object 101 to the display frame, the locking mechanism 102 may be designed to be in various different forms. A schematic diagram of a locking mechanism 102 is provided below, which may include the following contents.

Figure 4A:
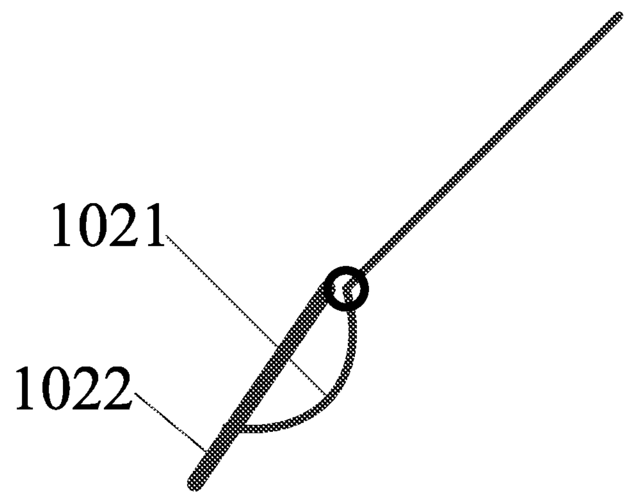
FIG. 4A is a schematic structural diagram of a closed locking mechanism according to some embodiments of the application.
Figure 4B:
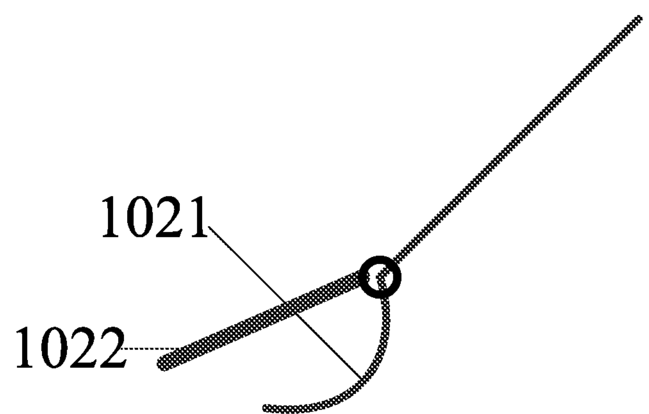
FIG. 4B is a schematic structural diagram of an opened locking mechanism according to some embodiments of the application.

As shown in FIG. 4A, the locking mechanism 102 may include a hook 1021. An independent hook 1021 is disposed for each object 101. The hook 1021 may be inclined, that is, there is a predetermined angle between the hook 1021 and a vertical direction. The predetermined angle may be less than 90 degrees, for example, 60 degrees or 70 degrees. The hook 1021 may have a plurality of appearance forms, for example, a semicircular hook 1021 or a Ω-shaped hook 1021, etc. As shown in FIG. 4A or FIG. 4B, in order to lock the object 101 on the locking mechanism 102, a controllable baffle 1022 may be disposed at the outermost end of the hook 1021. As shown in FIG. 4A, one or more objects 101 may be locked in the display frame through the controllable baffle 1022. The controllable baffle 1022 may be a baffle controlled by an electronic smart lock. As shown in FIG. 4B, when the locking mechanism 102 is opened, the controllable baffle 1022 is removed, and the object 101 arranged on the locking mechanism 102 is disengaged from the display frame.

In addition, as shown in FIG. 3, in order to help a demander (or a user) of the object 101 to perform resource transfer (for example, online payment, etc.) on one or more objects 101, a graphic code scanner 106 may be disposed on the display frame. In this way, after the demander (or the user) of the object 101 selects a desired object 101, the demander (or the user) may supply a graphic code for resource transfer to the display frame, and the display frame then sends the scanned graphic code to a corresponding payment server for performing identity verification on the user. After the verification succeeds, the display frame may generate a corresponding resource transfer information sheet, and the resource transfer may be performed using the resource transfer information sheet. For example, the display frame may receive a result of the identity verification from the payment server indicating the verification is successfully, and in response to the successful verification, the display frame performs the resource transfer for the user. After the resource transfer is successfully performed, the display frame may send an unlocking signal to a locking mechanism 102 at which the object 101 selected by the user is located. After the corresponding locking mechanism 102 receives the unlocking signal, the controllable baffle 1022 at the outermost end of the hook 1021 of the locking mechanism 102 may be removed, so that the object 101 on the hook 1021 is disengaged from the display frame. Then, the user can obtain the object 101.

Based on the above-described related contents, in order to embody the embodiments of the application, examples are used below to describe a structure and a use process of the display frame of the above-described object 101, which may include the following.

That the object 101 is a commodity, that the resource transfer is payment, and that the resource transfer information sheet is an order are taken as examples.

Commodities are hung on the display frame, and each commodity has an independent hook 1021. A controllable baffle 1022 controlled by an electronic smart lock is disposed at the outermost end of the hook 1021. Each hook 1021 may hang one or more commodities. The one or more commodities may be fixed to the hook 1021 through the controllable baffle 1022. When the controllable baffle 1022 is removed, the one or more commodities falls off the hook 1021.

The commodities displayed in the display frame may be touched by the user. In this way, the user may view a production date, a shelf life, description, etc., of a commodity displayed in the display frame, and may further feel a status of the commodity in the package with hands. In addition, in order to prevent the commodity from being stolen, a gravity sensor may be disposed on the hook 1021, and a corresponding gravity threshold may be set. When the gravity sensor detects that a current gravity value is greater than the gravity threshold that is set, the gravity sensor may deliver a reminder signal to an alarm and an external speaker to warn the user or the administrator. In addition, a graphic code scanner 106 is disposed on the display frame for scanning a graphic code (e.g., a QR code or a bar code, etc.) used by the user for payment.

After the user selects a to-be-purchased commodity on the display frame, the graphic code scanner 106 on the display frame may be used to scan a payment graphic code of a payment application (for example, Alipay) of the user. After obtaining the payment graphic code, the display frame may verify the identity of the user and store relevant identity information of the user. After the verification succeeds, an order for the commodity may be generated. The display frame may invoke a payment system to initiate debiting the user's account. When receiving a debiting success notification message sent by the payment system, the display frame may update the order of the commodity and send an unlocking signal to the controllable baffle 1022 of the locking mechanism 102 on which the commodity is located. After the controllable baffle 1022 receives the unlocking signal, the controllable baffle 1022 may be removed. Then, the commodity on the hook 1021 is disengaged from the display frame, and the user can pick up the commodity. Thus, a shopping process by the user is completed.

According to the object display frame provided in the embodiments of the present application, the object displayed in the display frame is touchable when locked in the display frame, and the display frame includes one or more locking mechanisms, one or more objects being arranged on each of the one or more locking mechanism, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the target object, improving object processing efficiency.

Figure 5:
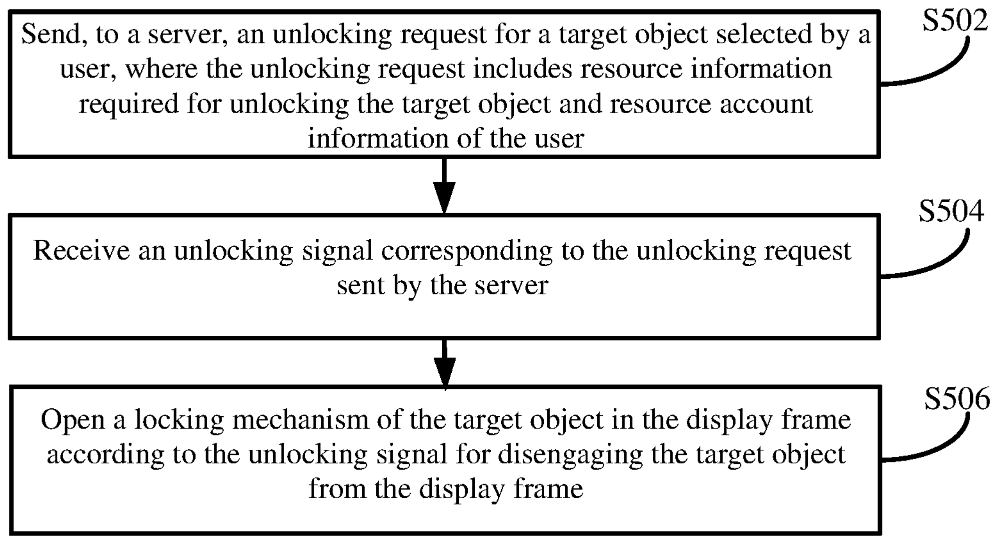
FIG. 5 shows an object processing method according to some embodiments of the application.

The object display frame provided in the embodiments of the application is described above. Based on the function and the composition structure of the object display frame, embodiments of the application further provide an object processing method. An executive body of the method may be the object display frame provided in the above embodiments. The object 101 displayed in the object display frame is touchable when locked in the display frame. For the composition structure of the object display frame, reference may be made to the related contents in the above-described object display frame embodiments, and details will not be repeated herein. As shown in FIG. 5, the method may include the following steps.

In step S502, sending an unlocking request for a target object 101 selected by a user to a server, where the unlocking request includes resource information required for unlocking the target object 101 and resource account information of the user.

The server may be a backend server for the object 101 displayed in the display frame. The server may be an independent server or a server cluster composed of a plurality of servers, etc. The target object 101 may be any of the objects 101 displayed in the display frame. The resource information may be information related to a condition to be met for unlocking the target object 101. For example, unlocking of the target object 101 requires a user to pay 10 Chinese yuan, or unlocking of the target object 101 requires the user to complete some action or a set of actions. The resource account information may be information related to an account for the user to perform resource transfer, for example, information of a payment account.

In some embodiments, when the user selects one or more objects 101 (that is, one or more target objects 101) displayed in the display frame, the display frame may enable the graphic code scanner 106 thereof, and the user may start a payment application installed in a mobile terminal such as a mobile phone. The front page of the payment application may further include a start option of a graphic code for resource transfer (for example, a payment graphic code). The user may tap the start option, and the mobile terminal may obtain the graphic code for resource transfer of the user. The graphic code may include resource account information of the user, and the mobile terminal may display the graphic code. The user may place the graphic code displayed by the mobile terminal in a scanning area of the graphic code scanner 106 of the display frame. The graphic code scanner 106 may obtain the graphic code displayed by the mobile terminal, and may generate an unlocking request for the corresponding target object 101 using the graphic code and resource information required for unlocking the target object 101, and may send the unlocking request to the server.

In step S504, receiving an unlocking signal corresponding to the unlocking request sent by the server.

In some embodiments, after receiving the unlocking request for the target object 101 sent by the display frame, the server may extract the resource information required for unlocking the target object 101 and the resource account information of the user in the unlocking request, and then may obtain a resource account of the user according to the resource account information. The server may determine, according to the resource information required for unlocking the target object 101, a resource value required for unlocking the target object 101. The resource value stored in the resource account of the user may be reduced by the resource value required for unlocking the target object 101, and the resource value stored in a resource account corresponding to the target object 101 is increased by the resource value required for unlocking the target object 101. For example, the resource value required for unlocking the target object 101 is 10 Chinese yuan, the resource value stored in the resource account of the user is 500 Chinese yuan, and the resource value stored in the resource account corresponding to the target object 101 is 0. Then, the resource value stored in the resource account of the user is reduced by the resource value required for unlocking the target object, and the resource value stored in the resource account corresponding to the target object 101 is increased by the resource value required for unlocking the target object 101. Then the resource value stored in the resource account of the user is changed to 490 (500−10) Chinese yuan, and the resource value stored in the resource account corresponding to the target object 101 is changed to 10 (0+10) Chinese yuan. Through the above-described process, the server completes the resource transfer for the target object 101. The server may send an unlocking signal to the display frame. The unlocking signal may include relevant information of the target object 101 and of the locking mechanism 102, and the relevant information may include identification information such as a name and a code. The display frame may receive the unlocking signal corresponding to the unlocking request sent by the server.

In step S506, opening the locking mechanism 102 of the target object 101 in the display frame according to the unlocking signal so that the target object 101 is disengaged from the display frame.

In some embodiments, after receiving the unlocking signal sent by the server, the display frame may extract the relevant information of the target object 101 and of the locking mechanism 102 in the unlocking signal, and may open the locking mechanism 102 of the target object 101 in the display frame according to the relevant information of the target object 101 and of the locking mechanism 102. Then, the controllable baffle 1022 is removed, and the target object 101 on the hook 1021 is disengaged from the display frame. Thus, the user may pick up the target object 101. In this way, the user may be facilitated to complete the transaction of the target object 101.

According to the object processing method provided in the embodiments of the present application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the object, improving object processing efficiency.

The object processing method provided in the embodiments of the application is described above. The method is based on the function and the composition structure of the object display frame. Embodiments of the application further provide an object processing method. An execution body of the method may be a server. The server may be an independent server or a server cluster composed of a plurality of servers.

Figure 6:
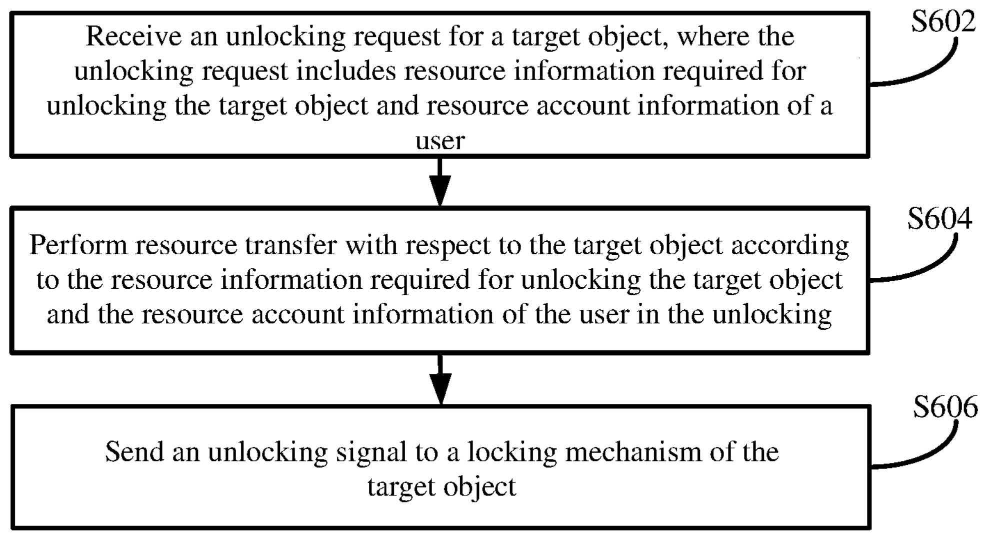
FIG. 6 shows another object processing method according to some embodiments of the application.

The object 101 displayed in the object display frame is touchable when locked in the display frame. For the composition structure of the display frame for the object 101, reference may be made to the related contents in the above-described object display frame embodiments, and details will not be repeated herein. As shown in FIG. 6, the method may specifically include the following steps.

In step S602, receiving an unlocking request for a target object 101, where the unlocking request includes resource information required for unlocking the target object 101 and resource account information of a user.

In step S604, performing resource transfer with respect to the target object 101 according to the resource information required for unlocking the target object 101 and the resource account information of the user in the unlocking request.

In step S606, sending an unlocking signal to the locking mechanism 102 of the target object 101.

For processing of the foregoing steps S602 to S606, reference may be made to the related contents in the above-described object processing method embodiments, and details will not be repeated herein.

According to the object processing method provided in the embodiments of the present application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the object, improving object processing efficiency.

Figure 7:
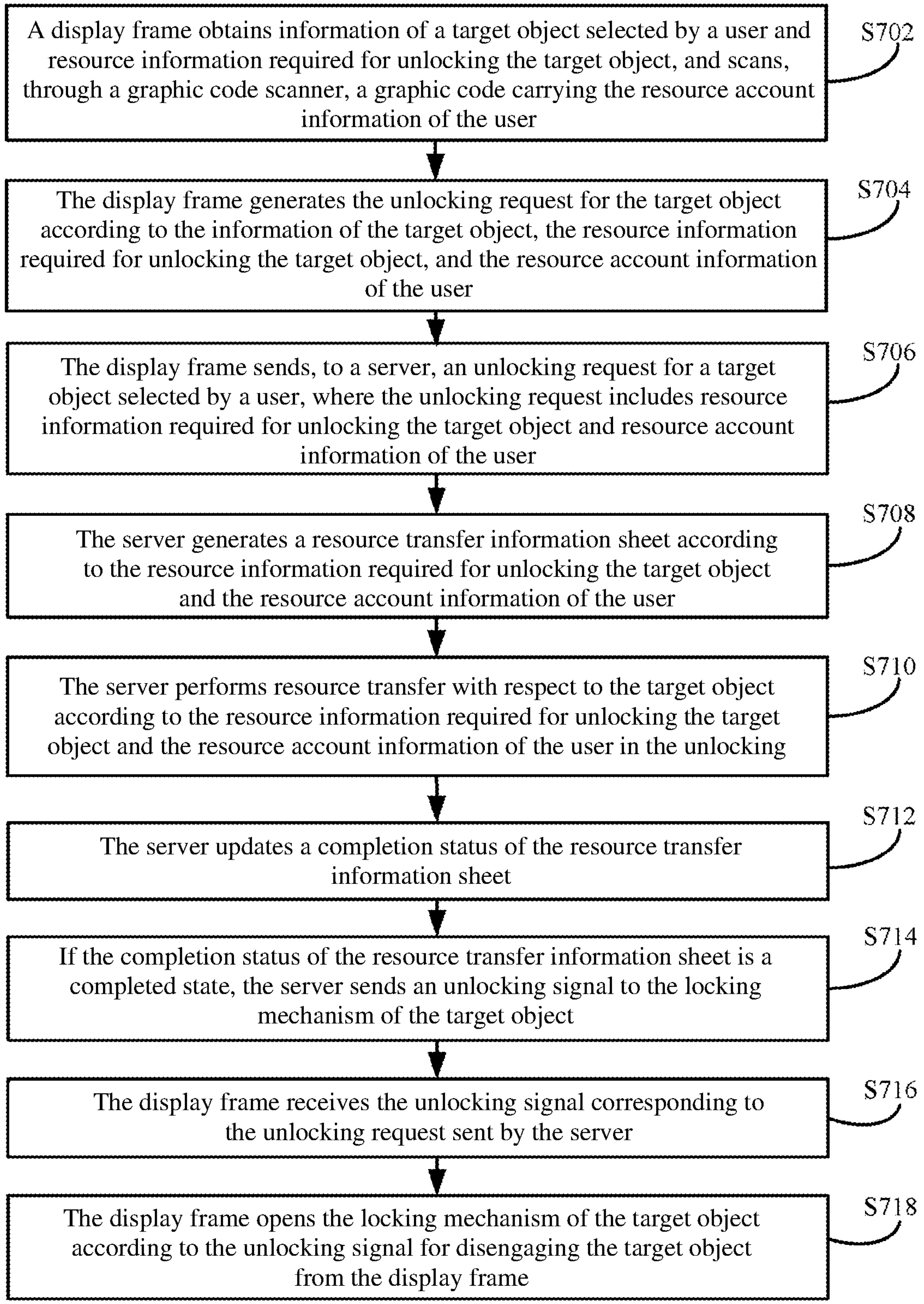
FIG. 7 shows still another object processing method according to some embodiments of the application.

Embodiments of the application further provide an object processing method. An executive body of the method may be the object display frame and the server provided in the above-described embodiments. The object 101 displayed in the object display frame is touchable when locked in the display frame. For the composition structure of the object display frame, reference may be made to the related contents in the above-described object display frame embodiments, and details will not be repeated herein. The server may be an independent server or a server cluster composed of a plurality of servers, etc. As shown in FIG. 7, the method may specifically include the following steps.

In step S702, the display frame obtains information of the target object 101 selected by the user and the resource information required for unlocking the target object 101, and scans, through a graphic code scanner 106, a graphic code carrying the resource account information of the user.

For example, the graphic code may be a QR code, a bar code, etc.

In some embodiments, the display frame for the object 101 may include a selection button for selecting the object 101. When a user is to select an object 101 (that is, the target object 101) in the display frame, the user may tap a selection button corresponding to the target object 101. The display frame may obtain information related to the target object 101 (for example, a name, a size, and a capacity, etc., of the target object 101), and may further obtain resource information required for unlocking the target object 101. In addition, a graphic code scanner 106 is disposed on the display frame. After a user selects the target object 101, the user may start a payment application installed in a mobile terminal. The front page of the payment application may further include a start option of a graphic code for resource transfer (for example, a payment graphic code). The user may tap the start option, and the mobile terminal may obtain the graphic code for resource transfer of the user. The graphic code may include resource account information of the user, and the mobile terminal may display the graphic code. The user may place the graphic code displayed by the mobile terminal in a scanning area of the graphic code scanner 106 of the display frame. The graphic code scanner 106 may obtain the graphic code displayed by the mobile terminal.

In step S704, the display frame generates the unlocking request for the target object 101 according to the information of the target object 101, the resource information required for unlocking the target object 101, and the resource account information of the user.

In step S706, the display frame sends, to a server, an unlocking request for a target object 101 selected by a user, where the unlocking request includes resource information required for unlocking the target object 101 and resource account information of the user.

After the display frame sends, to the server, the unlocking request for the target object 101 selected by the user, the server may receive the unlocking request for the target object 101.

In step S708, the server generates a resource transfer information sheet according to the resource information required for unlocking the target object 101 and the resource account information of the user. The resource transfer information sheet may be an order, etc.

In step S710, the server performs resource transfer with respect to the target object 101 according to the resource information required for unlocking the target object 101 and the resource account information of the user in the unlocking request.

For processing of the resource transfer in step S710, reference may be made to the above related contents, and details will not be repeated herein.

In step S712, the server updates a completion status of the resource transfer information sheet.

In some embodiments, after the server completes the above-described resource transfer for the target object 101, the completion status of the resource transfer for the target object 101 may be marked, and the resource transfer information sheet for the resource transfer for the target object 101 may be updated based on the marked completion status. The completion status may include a completed state and an uncompleted state.

In step S714, if the completion status of the resource transfer information sheet is a completed state, the unlocking signal is sent to the locking mechanism 102 of the target object 101.

In some embodiments, if the server determines that the completion status of the resource transfer information sheet for the target object 101 is a completed state, it may be determined that the user completes the resource transfer for the target object 101, and the target object 101 requested by the user may be unlocked for the user. For example, the server may obtain information such as an identifier of the target object 101, an identifier of a display frame in which the target object 101 is located, and an identifier of a locking mechanism 102 in which the target object 101 is located, and the unlocking signal for the target object 101 may be generated based on the above information, and may be sent to the display frame for the target object 101.

In step S716, the display frame receives the unlocking signal corresponding to the unlocking request sent by the server.

In some embodiments, after receiving the unlocking signal sent by the server, the display frame for the target object 101 may analyze the unlocking signal to extract the identifier of the locking mechanism 102 to be unlocked. The corresponding locking mechanism 102 may be found through the identifier of the locking mechanism 102, and the display frame may send the received unlocking signal to the found locking mechanism 102.

In step S718, the display frame opens the locking mechanism 102 of the target object 101 according to the unlocking signal for disengaging the target object 101 from the display frame.

For processing of the foregoing steps S702 to S718, reference may be further made to the related contents in the above-described object processing method embodiments, and details will not be repeated herein.

According to the object processing method provided in the embodiments of the present application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the object, improving object processing efficiency.

Figure 8:
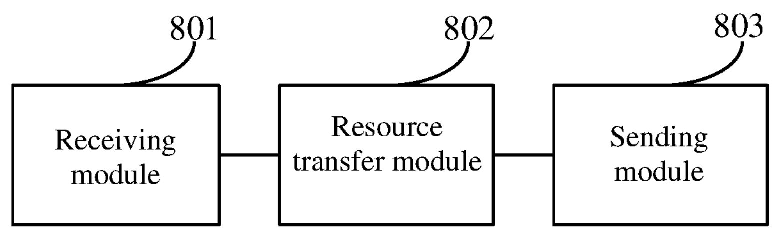
FIG. 8 shows an object processing device according to some embodiments of the application.

Based on the object processing method provided in the above-described server embodiments and the same concept, Embodiments of the application further provide an object processing device, which is shown in FIG. 8.

The object processing device includes: a receiving module 801, a resource transfer module 802, and a sending module 803.

The receiving module 801 is configured to receive an unlocking request for a target object, where the unlocking request includes resource information required for unlocking the target object and resource account information of a user. The resource transfer module 802 is configured to perform resource transfer with respect to the target object according to the resource information required for unlocking the target object and the resource account information of the user in the unlocking request. The sending module 803 is configured to send an unlocking signal to a locking mechanism of the target object. In the embodiments of the application, the device further includes: an information sheet generating module configured to generate a resource transfer information sheet according to the resource information required for unlocking the target object and the resource account information of the user. In addition, the sending module 803 includes: an updating unit configured to update a completion status of the resource transfer information sheet; and a sending unit configured to: if the completion status of the resource transfer information sheet is a completed state, send the unlocking signal to the locking mechanism of the target object.

According to the object processing device provided in the embodiments of the present application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the object, improving object processing efficiency.

Figure 9:
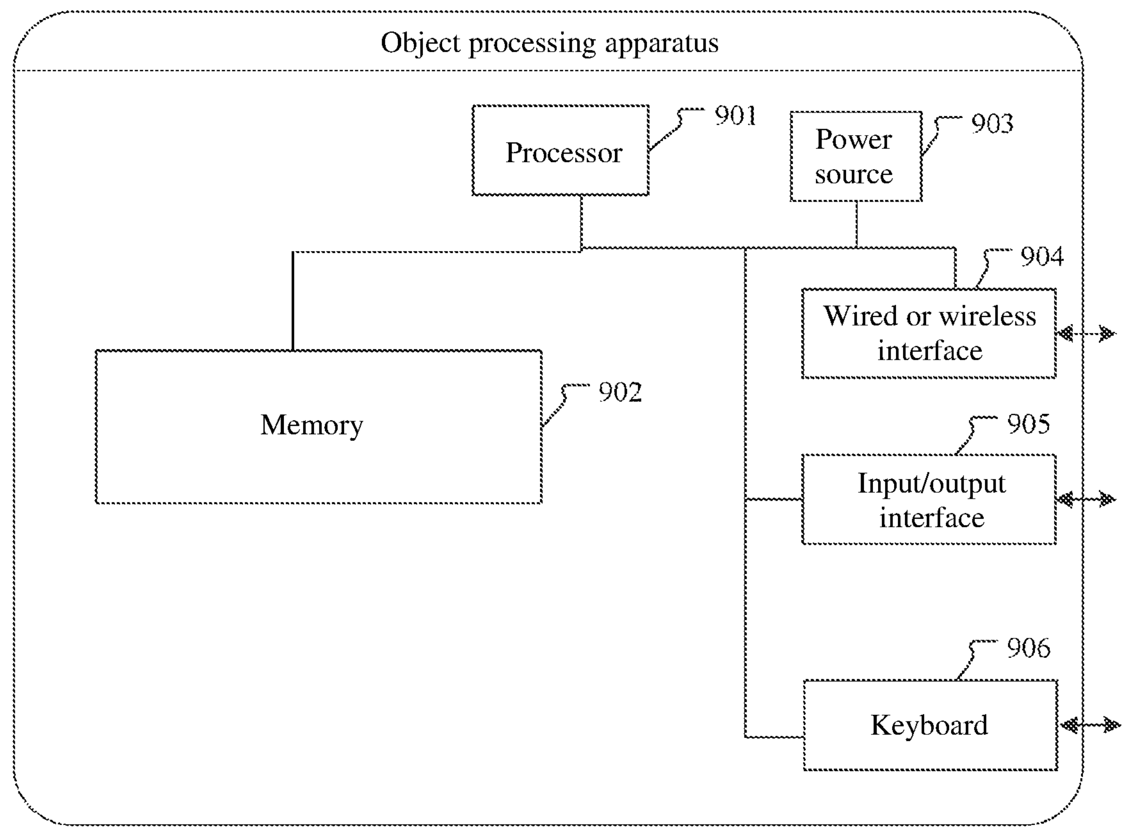
FIG. 9 shows an object processing apparatus according to some embodiments of the application.

Based on the same concept, Embodiments of the application further provide an object processing apparatus, which is shown in FIG. 9.

The object processing apparatus may be the server provided in the above-described embodiments, etc.

The object processing apparatus may have a relatively large difference among one another due to different configurations or performance, and may include one or more processors 901 and a memory 902. The memory 902 may store one or more storage applications or data. The memory 902 may be a non-persistent or persistent memory. An application stored in the memory 902 may include one or more modules (not shown). Each module may include a series of computer-executable instructions in the object processing apparatus. Further, the processor 901 may be configured to communicate with the memory 902 and execute a series of computer-executable instructions in the memory 902 in the object processing apparatus. The object processing device may further include one or more power sources 903, one or more wired or wireless network interfaces 904, one or more input/output interfaces 905, one or more keyboards 906, etc.

In the embodiments, the object processing device apparatus includes a memory and one or more programs. The one or more programs are stored in the memory, and may include one or more modules. Each module may include a series of computer-executable instructions in the object processing device, and the one or more processors are configured to execute the one or more programs to execute the following computer-executable instructions: receiving an unlocking request for a target object, where the unlocking request includes resource information required for unlocking the target object and resource account information of a user; performing resource transfer with respect to the target object according to the resource information required for unlocking the target object and the resource account information of the user in the unlocking request; and sending an unlocking signal to a locking mechanism of the target object. In some embodiments, the one or more processors are configured to execute the one or more programs to further execute the following computer-executable instructions: generating a resource transfer information sheet according to the resource information required for unlocking the target object and the resource account information of the user. The sending an unlocking signal to a locking mechanism of the target object includes: updating a completion status of the resource transfer information sheet; and if the completion status of the resource transfer information sheet is a completed state, sending the unlocking signal to the locking mechanism of the target object.

According to the object processing apparatus provided in the embodiments of the present application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the object, improving object processing efficiency.

Figure 10:
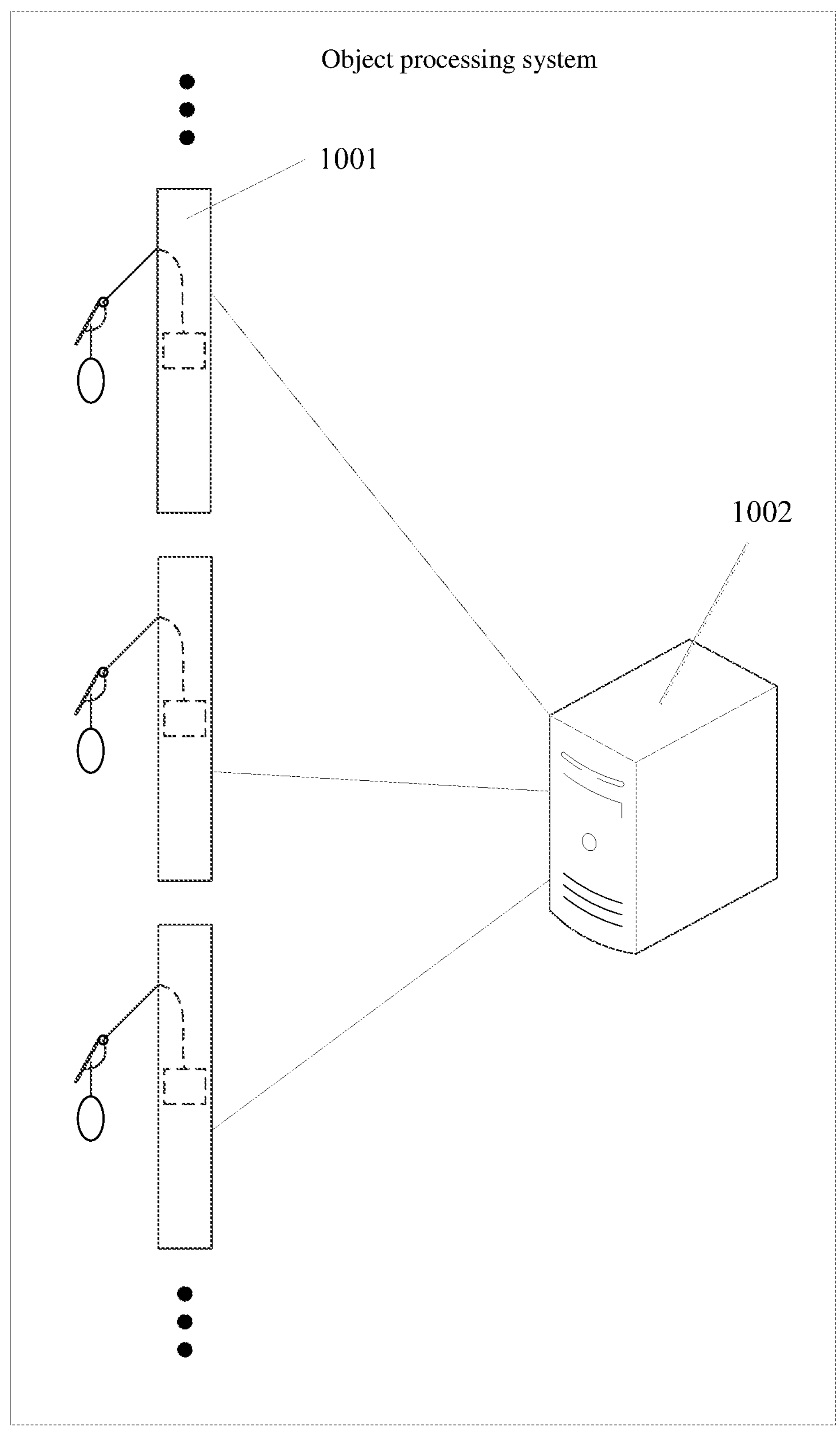
FIG. 10 shows an object processing system according to some embodiments of the application.

Based on the same concept, Embodiments of the application further provide an object processing system, which is shown in FIG. 10.

The object processing system includes one or more object display frames 1001 and a server 1002, the one or more object display frames 1001 being communicatively connected to the server 1002 respectively. An object displayed in the display frame 1001 is touchable when locked in the display frame. The display frame includes one or more locking mechanisms, one or more objects being arranged on each of the one or more locking mechanisms, and the display frame further includes a communication module connected to the one or more locking mechanisms respectively and configured to receive an unlocking signal sent by the server 1002, to control opening and closing of a corresponding locking mechanism.

When a locking mechanism is closed, the objects arranged on the locking mechanism are locked in the display frame, and when the locking mechanism is opened, the objects arranged on the locking mechanism are disengaged from the display frame.

In addition, the display frame 1001 further includes: a pressure sensor disposed on the locking mechanism; and a reminder module connected to the pressure sensor and configured to send a reminder signal when the pressure sensor detects that pressure of the locking mechanism reaches a predetermined pressure threshold.

In some embodiments, the locking mechanism includes a hook, a controllable baffle being disposed at the outermost end of the hook for locking an object, where when the locking mechanism is opened, the controllable baffle is removed, and the object arranged on the locking mechanism is disengaged from the display frame 1001.

In some embodiments, there is a predetermined angle between the hook and a vertical direction, the predetermined angle being less than 90 degrees.

In some embodiments, the display frame 1001 further includes a graphic code scanner configured to scan a graphic code for a user to perform resource transfer.

Based on the structure of the display frame 1001, the display frame 1001 may further perform the following operations: sending, to a server 1002, an unlocking request for a target object selected by a user, where the unlocking request includes resource information required for unlocking the target object and resource account information of the user; receiving an unlocking signal corresponding to the unlocking request sent by the server 1002; and opening a locking mechanism of the target object in the display frame according to the unlocking signal for disengaging the target object from the display frame 1001.

In some embodiments, information of the target object selected by the user and the resource information required for unlocking the target object are obtained, and a graphic code carrying the resource account information of the user is scanned through a graphic code scanner. The unlocking request for the target object is generated according to the information of the target object, the resource information required for unlocking the target object, and the resource account information of the user.

Correspondingly, the server 1002 may complete the following related operations: receiving an unlocking request for a target object, where the unlocking request includes resource information required for unlocking the target object and resource account information of a user; performing resource transfer with respect to the target object according to the resource information required for unlocking the target object and the resource account information of the user in the unlocking request; and sending an unlocking signal to a locking mechanism of the target object.

In some embodiments, a resource transfer information sheet is generated according to the resource information required for unlocking the target object and the resource account information of the user. In addition, the sending an unlocking signal to a locking mechanism of the target object includes: updating a completion status of the resource transfer information sheet; and if the completion status of the resource transfer information sheet is a completed state, sending the unlocking signal to the locking mechanism of the target object.

According to the object processing system provided in the embodiments of the present application, the object displayed in the display frame is touchable when locked in the display frame, and the display frame includes one or more locking mechanisms, one or more objects being arranged on each of the one or more locking mechanisms, when a locking mechanism is closed, the objects arranged on the locking mechanism being locked in the display frame, and when the locking mechanism is opened, the objects arranged on the locking mechanism being disengaged from the display frame; and the display frame further includes a communication module connected to the one or more locking mechanisms respectively and configured to receive an unlocking signal to control opening and closing of a corresponding locking mechanism. In this way, the object displayed in the display frame may be touched by a user, that is, the user is able to freely touch the object, check relevant information of the displayed object, and is facilitated to learn the information of the object in time. In addition, the unlocking request for the target object selected by the user is sent to the server, and the unlocking signal corresponding to the unlocking request sent by the server is received to control opening of the locking mechanism of the target object in the display frame to control unlocking of the object, improving object processing efficiency.

Embodiments of the application are described above. Other embodiments fall within the scope of the appended claims. In some embodiments, the actions or steps recorded in the claims may be performed in sequences different from those in the above-described embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable storage medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The systems, the apparatus, the modules or the units described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when an apparatus is described, the apparatus is divided into units according to functions, which are separately described. Certainly, in implementation of the application, the function of the units may be implemented in a same piece of or multiple pieces of software and/or hardware.

A person skilled in the art should understand that the embodiments in the application may be provided as a method, a system, or a computer program product. Therefore, the specification may use a form of hardware only embodiments, software only embodiments, or embodiments with a combination of software and hardware. Moreover, the specification may use a form of a computer program product that is implemented on one or more computer-usable storage media (including but not limited to a disk memory, a CD-ROM, an optical memory, and the like) that include computer-usable program code.

The application is described with reference to the flowchart and/or block diagram of the method, device (system), and computer program product of the embodiments in the application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to operate in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a computer-readable storage medium.

The computer-readable storage medium includes a persistent medium and a non-persistent medium, a removable medium and a non-removable medium, which may implement storage of information by using any method or technology. The information may be a computer readable instruction, a data structure, a module of a program or other data. Examples of computer-readable storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the application, the computer-readable medium does not include transitory computer readable media (transitory media), such as a modulated data signal and a carrier. Based on the definition herein, the computer-readable storage medium does not include transitory computer readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not explicitly listed, or include inherent elements of the process, method, article and device. Without further limitation, the element defined by a phrase "include one" does not exclude other same elements in the process, method, article or device which includes the element.

The application can be described in the general context of computer-executable instructions executed by a computer, for example, a program module. Generally, the program module includes a routine, a program, an object, a component, a data structure, and the like for executing a particular task or implementing a particular abstract data type. The application may also be practiced in distributed computing environments in which tasks are performed by remote processing devices that are connected by using a communications network. In a distributed computing environment, the program module may be located in both local and remote computer storage media including storage devices.

The embodiments in the application are all described in a progressive manner, for same or similar parts in the embodiments, refer to these embodiments, and descriptions of each embodiment focus on difference from other embodiments. Especially, a system embodiment is basically similar to a method embodiment, and therefore is described briefly; for related parts, reference may be made to partial descriptions in the method embodiment.

The foregoing descriptions are merely embodiments in the application and are not intended to limit the application. For a person skilled in the art, various modifications and changes may be made to the specification. Any modification, equivalent replacement, or improvement made without departing from the spirit and principle of the application shall fall within the scope of the claims of the application.

What is claimed is:

1. A display frame, comprising a post and a plurality of lock assemblies attached to the post, wherein:

- the post comprises a circuit coupled to the plurality of lock assemblies and comprises a graphic code scanner coupled to the circuit;
- each of the plurality of lock assemblies is configured to hang a physical object and lock the physical object on the display frame, wherein the physical object is touchable by a user;
- the graphic code scanner is configured to scan a graphic code provided by the user, to perform resource transfer for the physical object;
- the circuit is configured to send the scanned graphic code to a server for performing identity verification on the user, and in response to receiving a result indicating that the identity verification succeeds, initiate the resource transfer for the physical object;
- for each of the plurality of lock assemblies, the circuit is further configured to send to the lock assembly an unlocking signal including an identification of the physical object for opening the lock assembly in response to receiving a notice indicating that the resource transfer has been successfully performed for the physical object;
- in response to the unlocking signal, the lock assembly is configured to open and release the physical object from the display frame based on the identification of the physical object;
- wherein the display frame further comprises a pressure sensor disposed on the lock assembly, wherein the pressure sensor is configured to detect a pressure applied by a weight of the physical object on the lock assembly; and
- wherein the display frame further comprises an alarm device connected to the pressure sensor, wherein the pressure sensor is configured to send a pressure trimer signal to the alarm device in response to detecting that the pressure reaches a pressure threshold, and the alarm device is configured to receive the pressure trigger signal and output an alarm signal comprising an identification of the display frame and an identification of the lock assembly.

2. The display frame according to claim 1, wherein the lock assembly comprises a hook for hanging the physical object and a controllable baffle disposed at an outermost end of the hook for locking the physical object, wherein in response to the unlocking signal, the lock assembly is configured to remove the controllable baffle to disengage the physical object locked on the lock assembly from the display frame.

3. The display frame according to claim 2, wherein the pressure sensor is a gravity sensor disposed on the hook hanging the physical object, wherein the gravity sensor is configured to detect a gravity value at the hook, and send a gravity trigger signal to the alarm in response to the gravity value at the hook being greater than a gravity threshold.

4. The display frame according to claim 2, wherein the hook and a vertical direction forms an angle, the angle being less than 90 degrees.

5. The display frame according to claim 1, wherein the graphic code comprises resource account information of the user, and the circuit is further configured to send resource information for unlocking the physical object to the server.

6. An object processing method, applied to a display frame far, wherein the method comprises:

- hanging and locking, by a first lock assembly, a first physical object on the display frame;
- hanging and locking, by a second lock assembly, a second physical object on the display frame, wherein:
  - the display frame comprises a post, the first and the second lock assemblies attached to the post, a first and a second pressure sensors respectively disposed on the first and the second lock assemblies, and a first and a second alarm devices respectively connected to the first and the second pressure sensors,
  - the post comprises a circuit coupled to the first and the second lock assemblies and comprises a graphic code scanner coupled to the circuit, and
  - the first and the second physical objects are touchable by a user;
- detecting, by the first pressure sensor, a pressure applied by a weight of the first physical object on the first lock assembly;
- sending, by the first pressure sensor, a pressure trigger signal to the first alarm device in response to detecting that the pressure reaches a pressure threshold;
- receiving, by the first alarm device, the pressure trigger signal;
- outputting, by the first alarm device, an alarm signal comprising an identification of the display frame and an identification of the first lock assembly;
- scanning, by the graphic code scanner, a graphic code provided by the user to perform resource transfer for the second physical object;
- sending, by the circuit, the scanned graphic code to a server for performing identity verification on the user;
- in response to receiving a result indicating that the identity verification succeeds, initiating, by the circuit, the resource transfer for the second physical object;
- sending, by the circuit, to the second lock assembly an unlocking signal including an identification of the second physical object for opening the second lock assembly in response to receiving a notice indicating that the resource transfer has been successfully performed for the second physical object; and
- in response to the unlocking signal, releasing, by the second lock assembly, the second physical object from the display frame based on the identification of the second physical object.

7. The method according to claim 6, wherein the graphic code includes resource account information of the user.

8. The method according to claim 7, further comprising:

- obtaining, by the circuit, information of the second physical object and resource information for unlocking the second physical object; and
- generating, by the circuit, an unlocking request for unlocking the second physical object according to the information of the second physical object, the resource information for unlocking the second physical object, and the resource account information of the user.

9. The method according to claim 8, further comprising: sending, by the circuit to the server, the unlocking request for unlocking the second physical object, wherein the unlocking request comprises the resource information for unlocking the second physical object and the resource account information of the user.

10. The method according to claim 6, wherein the second lock assembly comprises a hook and a controllable baffle disposed at an outermost end of the hook, the hook is configured to hang the second physical object, and the controllable baffle is configured to lock the second physical object, and wherein opening the lock assembly comprises: removing the controllable baffle to disengage the second physical object locked on the second lock assembly from the display frame.

11. An apparatus for object processing, comprising: a post, a first and a second lock assemblies attached to the post, a first and a second pressure sensors respectively disposed on the first and the second lock assemblies, and a first and a second alarm devices respectively connected to the first and the second pressure sensors, wherein:

the post comprises a circuit coupled to the first and the second lock assemblies and comprises a graphic code scanner coupled to the circuit;

the first lock assembly is configured to hang and lock a first physical object on the apparatus;

the second lock assembly is configured to hang and lock a second physical object on the apparatus, wherein the first and the second physical objects are touchable by a user;

the first pressure sensor is configured to detect a pressure applied by a weight of the first physical object on the first lock assembly;

the first pressure sensor is configured to send a pressure trigger signal to the first alarm device in response to detecting that the pressure reaches a pressure threshold;

the first alarm device is configured to receive the pressure trigger signal;

the first alarm device is configured to output an alarm signal comprising an identification of the apparatus and an identification of the first lock assembly;

the graphic code scanner is configured to scan a graphic code provided by the user to perform resource transfer for the second physical object;

the circuit is configured to send the scanned graphic code to a server for performing identity verification on the user;

the circuit is configured to, in response to receiving a result indicating that the identity verification succeeds, initiate the resource transfer for the second physical object;

the circuit is configured to send to the second lock assembly an unlocking signal including an identification of the second physical object for opening the second lock assembly in response to receiving a notice indicating that the resource transfer has been successfully performed for the second physical object; and the second lock assembly is configured to, in response to the unlocking signal, release the second physical object from the apparatus based on the identification of the second physical object.

12. The apparatus according to claim 11, wherein the graphic code includes resource account information of the user.

13. The apparatus according to claim 12, wherein the circuit is configured to obtain information of the second physical object and resource information for unlocking the second physical object; and the circuit is configured to generate an unlocking request for unlocking the second physical object according to the information of the second physical object, the resource information for unlocking the second physical object, and the resource account information of the user.

14. The apparatus according to claim 13, wherein the circuit is configured to send, to the server, the unlocking request for unlocking the second physical object, wherein the unlocking request comprises the resource information for unlocking the second physical object and the resource account information of the user.

15. The apparatus according to claim 11, wherein the second lock assembly comprises a hook and a controllable baffle disposed at an outermost end of the hook, the hook is configured to hang the second physical object, and the controllable baffle is configured to lock the second physical object.

* * * * *

UNITED STATES PATENT AND TRADEMARK OFFICE

CERTIFICATE OF CORRECTION

PATENT NO. : 10,930,098 B2
APPLICATION NO. : 16/905432
DATED : February 23, 2021
INVENTOR(S) : Chuan Lu It is certified that error appears in the above-identified patent and that said Letters Patent is hereby corrected as shown below:

In the Claims

Claim 1, Column 21, Line 49:
"pressure trimer" should read -- pressure trigger --.

Claim 6, Column 22, Line 11:
"display frame far, wherein" should read -- display frame, wherein --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*